July 11, 1967 J. K. STEWART ETAL 3,330,220
SPIKE DRIVER
Filed Oct. 7, 1964 4 Sheets-Sheet 1

INVENTORS
JOHN K. STEWART
DIMITRI MACRIS

INVENTORS
JOHN K. STEWART
DIMITRI MACRIS

United States Patent Office 3,330,220
Patented July 11, 1967

3,330,220
SPIKE DRIVER
John Kenneth Stewart, Dorval, Quebec, and Dimitri T. Macris, Montreal, Quebec, Canada, assignors to Canada Iron Foundries Limited, Montreal, Quebec, Canada
Filed Oct. 7, 1964, Ser. No. 402,074
Claims priority, application Canada, Oct. 8, 1963, 886,283
8 Claims. (Cl. 104—17)

This invention relates to railroad spike driving apparatus.

In the past power operated spike drivers have been provided to replace the hand hammers but the speed of production of the spike drivers has been hampered by the inability of prior spike positioning devices to operate at speeds capable of utilizing the great capacity of the power operated spike drivers.

The present invention provides spike driving apparatus which will utilize automatic spike feeding members to take advantage of the capacity of the power operated spike driver.

According to the present invention a spike driving apparatus comprises a first frame member, a power operated spike driver mounted for reciprocation relative to the first frame member, power operated means for reciprocating the spike driver, spike feeding means on the first frame member, spike positioning means mounted on the first frame member; first cam means operable on relative motion between the spike driver, away from the track, and the first frame member to actuate the spike feeding means to deliver a spike to be driven into position beneath the spike driver; and second cam means operable on relative movement of the spike driver, in the direction towards the track, and the first frame member to actuate the spike positioning means to engage and retain the spike in spike driving position; the second cam means being operable by further relative movement between the spike driver and first frame member to remove the spike feeding means from engagement with the positioned spike. The second cam means is preferably operable on still further relative motion between the spike driver and first frame member to release the spike positioning means after the spike has been partially driven.

Preferably the spike driving apparatus of the present invention is provided with a swinging frame member on which the first frame member and the spike driver are mounted and in which the power operated means for reciprocating the spike driver is mounted to reciprocate the spike driver relative to the first frame member and to the swinging frame member and to reciprocate the first frame member, relative to the swinging frame member whereby the spike driving apparatus may be lifted clear of the rails.

According to a feature of the invention the swinging frame is mounted on a base frame member rotatably mounted on a workhead carrier on a rail travelling car whereby said base frame and the elements thereon may be rocked inwardly towards the base of each rail from either side thereof.

The following is a description by way of example of one embodiment of the invention reference being had to the accompanying drawings in which.

Figure 1:
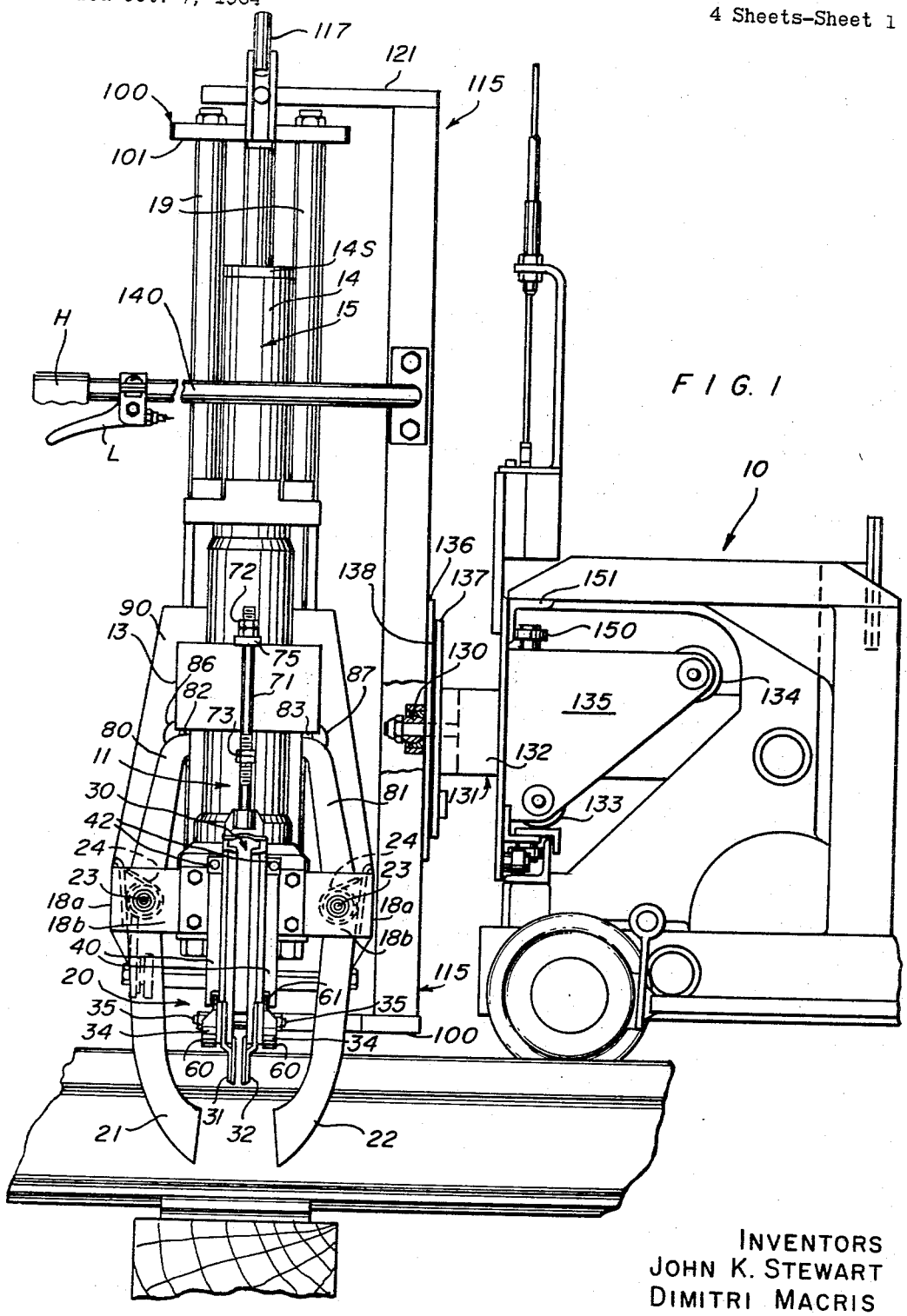
FIGURE 1 is a side elevation of the spike driving apparatus mounted on a rail engaging vehicle.

Turning now to the drawings:

A rail travelling vehicle 10, which may or may not be self-propelled, is provided with a power operated pump (not shown) for providing air pressure for the spike driving device according to the invention. A spike driver or air hammer 11 of conventional design is mounted together with a first frame 18, carrying a spike feeding means 20, on a swinging frame 100, which is itself mounted on a base frame 115. The frame 115 is rockingly supported on a workhead carrier 131 which is arranged for transverse track travel in the vehicle.

The spike driver 11 is mounted on, and secured to, a retaining collar 13 which is securely clamped to the cylinder 14 of a pneumatic piston and cylinder means 15 having ports 15p. The first frame 18 is mounted for reciprocation on guides 19 and in the position shown in FIGURES 1 and 2, rests on a stop member 19S. The first frame member 18 carries the spike feeding means 20 at the end of side arms 18a. A pair of spike positioning clamps 21 and 22 are pivotally mounted on pins 23 on the first frame member yokes 18b and are spring urged away from each other by the springs 24. Mounted above the spike feeding means 20 on the yokes 18b is a spike holding magazine 30 in communication with the spike feeding means 20.

The spike feeding apparatus comprises a pair of spike retaining spring steel leaves 31, 32 each of which is attached to a rotary cam 34 mounted for rotation about pins 35 at the bottom of the magazine 30. An inner and an outer gate is provided on the magazine. The outer gate comprising the levers 40 which are pivotally mounted at 42 on either side of the magazine 30 and are urged by springs 46 about their pivots 42 against the sides of the magazine. The levers 40 each carry an inwardly directed pin 50 which enters into the magazine and when the levers 40 are against the side of the magazine the pins 50 project into the magazine and prohibit the gravity feeding of a spike beyond the pins 50.

The inner gate 51 is a duplication of the outer gate and comprises a pair of levers 52 one on either side of the magazine and spring urged thereagainst by springs 54. The levers 52 carry at their lower ends pins 58 which project into the magazine and when closed prohibit the gravity feed of a spike beyond the pins 58 into the spring steel leaves 31, 32. The inner and outer gates effectively define a breech section between them.

The cams 34 have a raised camming surface 60 and a low camming surface 61. Rotation of the cams in one direction or the other about their pivots 35 cause the raised surface 60 of the cams to engage the end 63 or 64 of the levers 52 and 40 and to selectively swing them about their pivots 42 against the bias of the springs 46, 54 whereby to selectively withdraw the pins 50 or 58 from the magazine to open one gate or the other to permit of the gravity feeding of a spike.

Figure 2:
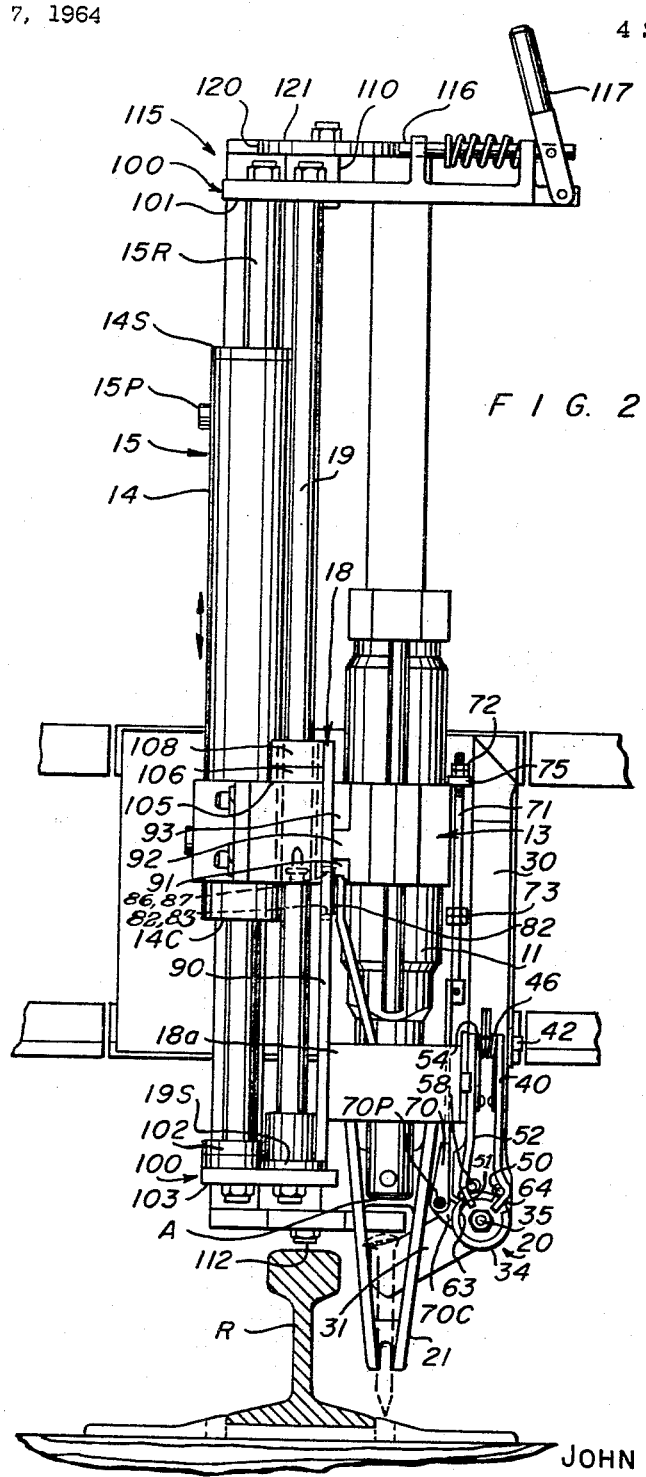
FIGURE 2 is a view of the spike driving apparatus of FIGURE 1 looking in the direction of the railroad track.
Figure 3:
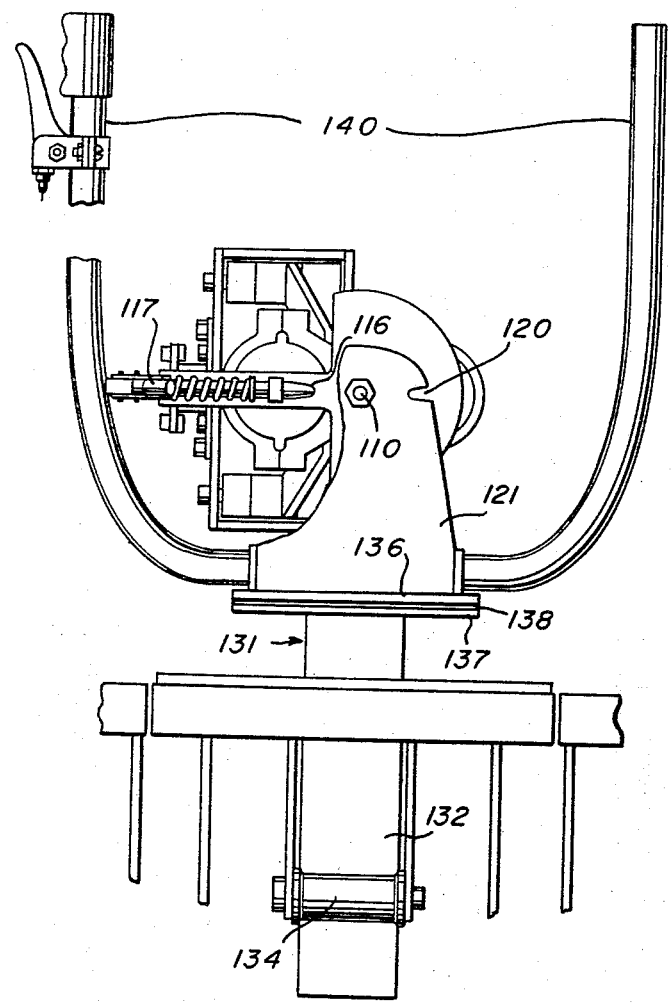
FIGURE 3 is a plan view of the apparatus of FIGURE 1.
Figure 4:
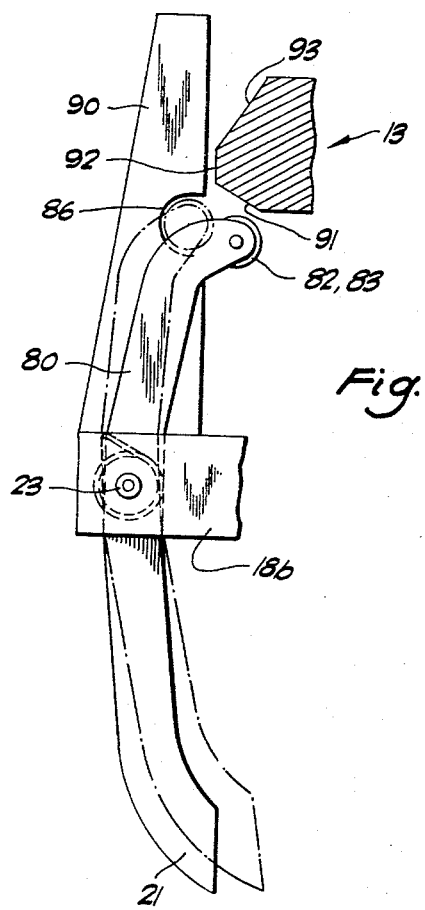
FIGURES 4 and 5 are details.
Figure 5:
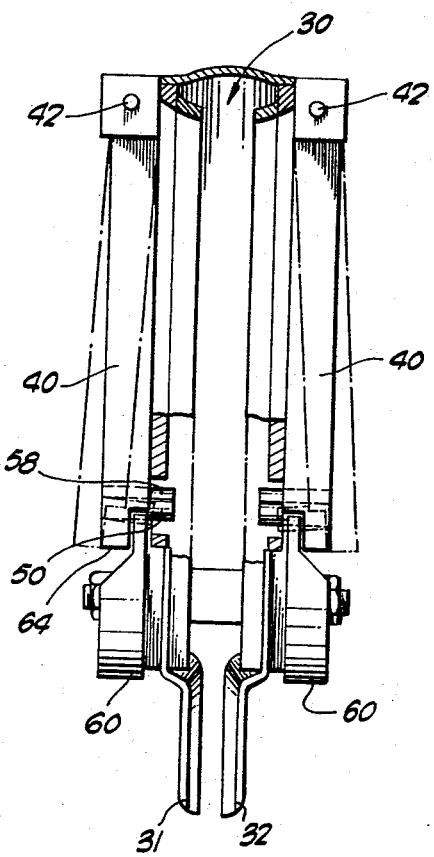

Attached to the cams 34 and thus to the spring steel leaves 31, 32 through the pin 70p and crank 70c is a cam operating link 70 which has at the upper end thereof a cam rod 71. Cam nuts 72 and 73 are screw threadedly adjustable on the cam rod 71. Thus movement of the cam rod 71 in the upward direction due to the engagement of the projection 75 on the collar 13, (the first cam means), with the cam nut 72 on the upward movement of the spike drive 11 relative to the frame 18 to be more fully described hereinafter, causes the swinging of the spring steel leaves into a position beneath the hammer as indicated in FIGURE 2. The engagement of the raised portion of the cam with the members 63 forces pins 58 outwardly and permits the gravity feed of a spike held by the pins 58 into the spring steel leaves whilst the members 64 of the levers 40 fall into the low point 61 thereby inserting the pins 50 into the magazine and prohibiting the passage of a further spike into the spring steel leaves.

The positioning clamps 21, 22 carry cam bars 80 and 81 at the ends of which are provided rollers 82, 83. The bars 80 and 81 are rigidly connected to the clamps 21 and 22 and swing therewith about the pivots 23. Outward swinging of the cam bars 80 and 81 to force the clamps 21 and 22 towards each other, is accommodated by recesses 86, 87 in the back plate 90 of the first frame member 18 which receive the rollers 82, 83.

On each side of the spike driver supporting collar 13 is the second cam means consisting of three camming surfaces 91, 92 and 93. The camming surfaces 91 are downwardly directed and sloped toward each other, the cam surfaces 92 are flat and raised and parallel on each side, and the camming surfaces 93 are upwardly directed surfaces sloping towards each other.

The spike driver 11 on its collar 13 which is attached to the cylinder 14 of the pneumatic piston and cylinder arrangement 15 is capable of reciprocal movement with the cylinder 14 on the piston rod 15R, which is attached at either end to the swinging frame 100. Upward travel of the driver 11 is limited by the engagement of the stop 14S at the top of the cylinder 14 with the underside of the upper plate 101 of the swinging frame 100 and downward movement of the spike driver 11 is limited by engagement of the underside of the cylinder 14C with the stop pads 102 on the lower plate 103 of the rotating frame 100. Movement of the first frame 18 from the position shown in FIGURE 2 upwards along the guides 19 is achieved by engagement of a lifting surface 105 on the collar 13 with a pad 106 on the projection 108 welded to the back plate 90 of the first frame member 18. Thus whilst the spike driver 11 can move downwardly relative to the frame 18 from the position indicated in FIGURE 2 (to drive a spike) and upward movement of the spike driver 11 from that position, due to the admission of air under pressure at the upper port 15P, will cause the surface 105 to engage the pad 106 and lift the first frame 18 together with its clamps 21 and 22 and its spike feeding device 20 and magazine 30. Upward movement of this kind permits the spike feeding device and the clamps 21 and 22 to be lifted clear of the top of the rail.

The swinging frame 100 is rotatably mounted on stub axles 110, 112 on the base frame 115. A spring loaded locking pin 116, which is manually operated by handle 117, positively locates the frame 100 with the spike driver and spike feeding apparatus 20 thereon on one side or the other of the rail by engaging in slots 120 in the top plate 121 of the base frame 115. Thus, when the base frame 115 is centrally located above a rail, that it to say, when the axles 110, 112 are vertically aligned with the center of the rail the spike driver 11, spike feeding means 20 and positioning elements 21, 22 may be readily located in spike driving position on either side of the rail by operating the handle 117 and swinging the frame 100 to whichever side of the rail is desired and thereafter by releasing the handle 117 to cause the pin 116 to engage in the slot 120. This is because the center of the spike puller 11 is offset from the stub axles 110, 112 by a distance equal to the normal spike displacement from the rail centre.

The base frame is in its turn mounted on pivot bearing 130 on the workhead carrier 131. The workhead carrier may suitably be provided with a telescopic arm 132 riding on rollers 133, 134 on the workhead carrier frame 135. The base frame 115 is provided with a back plate 136 and the workhead carrier may be provided with a front plate 137 a friction lining 138 being provided between the plates 136 and 137. Thus, by moving the handle bars 140 the base frame 115 may be rocked about the pivot 130 to rock inwardly towards the rail. That is to say, the spike driver 11 and the clamps 21, 22 may be rocked with the frame 115 about the pivot 130 in a clockwise or anti-clockwise direction, when viewed in FIGURE 2 so that the spike may be positioned at any desirable approach angle to the base of the rail, prior to driving.

The workhead carrier is suitably mounted on rollers 150 in guides 151 so that the base frame 115 may be moved transversely of the track to position the frame 100 over each rail. In the embodiment shown, the base frame 115 would be manually moved across the track on the rollers 150 to position it over either rail but it will be obvious that this transverse movement could be accomplished by power operated means, at which time it would probably be desirable to provide a seat for the operator so that he could perform his functions whilst sitting. In such an arrangement the operator would also probably be provided with a remote control element for operating a prime mover to move the vehicle 10 along the track.

The operation of the device will now be described, taking as the starting position, the position shown in FIGURE 2. It must be assumed that a spike has already been driven on the left hand side of the rail R and that air was thereafter admitted to the cylinder via port 15p. Now during the upward travel of the spike driver 11 the first cam means comprising the projection 75 on the collar 13 operated on the nut 72 to deliver a spike into the spring steel leaves 31, 32 which are moved into position beneath the anvil A of the spike driver 11. The first frame means with its attachments were then moved upwards clear of the rail by further cylinder movement. The lever 117 was then operated and the swinging frame 100 with its attachments moved and locked in the right hand side of the rail R. The control lever L (FIG. 1) on handlebars H was operated to partially exhaust the cylinder 14 and permit the spike driver 11 and first frame 18 to drop under their own weight to the position shown in FIGURES 1 and 2 at which the workhead has been located so that a spike may be driven at the right-hand side of the right-hand rail of a track. The frame 18 is now resting on its stops 19S at the bottom of the guides 19. Further operation of the operating lever L operates a valve to start the hammering operation of the anvil A of the spike driver and to further exhaust the cylinder 14 to gravity lower the spike driver 11 down towards the spike to be driven. Relative movement of the spike driver 11 on its collar 13 causes the sloping faces 91 of the second cam means on the collar 13 to engage the cam rollers 82, 83 so that the cam rollers 82, 83 on the cam bars 80, 81 are forced outwardly into recesses 86, 87 in the back plate 90 causing the rotation of the spike clamps 21, 22 about their pivots 23 against the action of the springs 24 so that they clamp the spike and act to position it. The clamps are retained in this position whilst the high surface 92 of the second cam means passes through and maintains the cam rollers 82, 83 in the recesses 86, 87 and during this time the first cam means comprising projection 75 operates on the second nut 73 on the cam bar 71 to cause the cam bar 70 to be forced downwardly and the spring steel leaves 31, 32 to be disengaged from the spike now held in position by the clamps 21 and 22. Also the cam 34 is rotated to close gate 51 and open gate 50 to permit the next spike in the magazine 30 to be gravity fed into the gate 51 but not into the spring steel leaves 31, 32. Further downward movement of the spike driver 11 which has now partially driven the spike, causes the upwardly and inwardly sloping surface 93 of the second cam means to engage the rollers 82, 83 to permit the rollers to return inwardly under the actions of the spring 24 so that the clamps 21 and 22 now disengage from the partially driven spike. After the completion of the driving stroke the lever L is operated to admit air under pressure to the cylinder 14 to return the hammer upwardly until the first cam means is operated to actuate the bar 71, the lever 70 and cause the spring steel leaves with the next spike to be fed to be introduced beneath the anvil A.

The base frame is then moved transversely of the track in guides 151 to be positioned over the other rail and the spike driving operation is repeated.

The embodiments of the invention in which an exclusive property or privilege is claimed are defined as follows:

1. A railroad spike driving apparatus comprising a first frame member, a power operated spike driver mounted for reciprocation relative to the first frame member, power operated means for reciprocating the spike driver, spike feeding means on the first frame member; spike positioning means mounted on the first frame member; first cam means operable on relative motion between the spike driver, away from the railroad track, and the first frame member to actuate the spike feeding means to deliver a spike to be driven into position beneath the spike driver; second cam means operable on relative movement of the spike driver, in the direction towards the railroad track, and the first frame member to cause the spike positioning means to engage and retain the spike in spike driving position; the second cam means being operable by further relative movement between the spike driver and first frame member to release the spike positioning means after the spike has been partially driven; a swinging frame member on which the first frame member and the spike driver are mounted, and in which the power operated means for reciprocating the spike driver is mounted to reciprocate the spike driver relative to the first frame member and to the swinging frame member and to reciprocate the first frame member relative to the swinging frame member whereby the spike driving apparatus may be lifted clear of the rails.

2. A device as claimed in claim 1 in which the swinging frame member is mounted on a base frame member rotatably mounted on a workhead carrier on a rail traveling car whereby said base frame and the elements thereon may be rocked inwardly towards the base on each rail from either side thereof.

3. A device as claimed in claim 2 in which the base frame is mounted in guides for transverse movement on the rail traveling vehicle so that the spike driving apparatus may be positioned over either rail of the track.

4. Apparatus as claimed in claim 1 in which the spike feeding means comprises a pair of gripper members adapted to be operated by the first cam member, a magazine for retaining spikes to be driven in communication with said gripper members and gate means between said magazine and said gripper members operated by said first cam means to feed one spike at a time to said gripper means.

5. Apparatus as claimed in claim 1 in which the spike positioning means comprise a pair of pivoted clamps operated by the second cam means to swing towards each other for engagement with the spike and to swing away from each other to be separated clear of the spike.

6. Apparatus as claimed in claim 1 in which the swinging frame may be rotated on and locked in two positions on either side of the base frame so that when the base frame is centered over a rail the swinging frame may be moved on the base frame and locked in position thereon to drive a spike on either side of that rail.

7. A railroad spike driving apparatus comprising a first frame member, a power operated spike driver mounted for reciprocation relative to the first frame member, power operated means for reciprocating the spike driver, spike feeding means on the first frame member, spike positioning means mounted on the first frame member, and actuating mechanism for the spike feeding means and spike positioning means said mechanism being operatively associated with the spike driver in such a manner that movement of the spike driver in a direction away from the railroad track causes the feeding means to deliver a spike to be driven into position beneath the spike driver and movement of the spike driver in a direction towards the track causes the positioning means first to grip the delivered spike and then to release the spike after it has been partially driven.

8. A railroad spike driving apparatus comprising a first frame member, a power operated spike driver mounted for reciprocation relative to the first frame member, power operated means for reciprocating the spike driver, spike feeding means on the first frame member including a magazine for containing a plurality of spikes, a breech defined by a first, upper, gate means and a second, lower, gate means; spike positioning means mounted on the first frame member; first cam means operable on relative motion between the spike driver, away from the railroad track, and the first frame member to actuate said second gate means to deliver a single spike to be driven from the breech, into position beneath the spike driver; and second cam means operable on relative movement of the spike driver, in the direction towards the railroad track, and the first frame member to cause the spike positioning means to engage and retain the spike in spike driving position; said second cam means being operable by further relative movement between the spike driver and first frame member to release the spike positioning means after the spike has been partially driven and said first cam means being operable upon such movement to open said first upper gate means to feed a single spike from the magazine to the breech.

References Cited

UNITED STATES PATENTS 3,163,122  12/1964  Johnson _____ 104—17

ARTHUR L. LA POINT, *Primary Examiner.*

R. A. BERTSCH, *Assistant Examiner.*